UNITED STATES PATENT OFFICE.

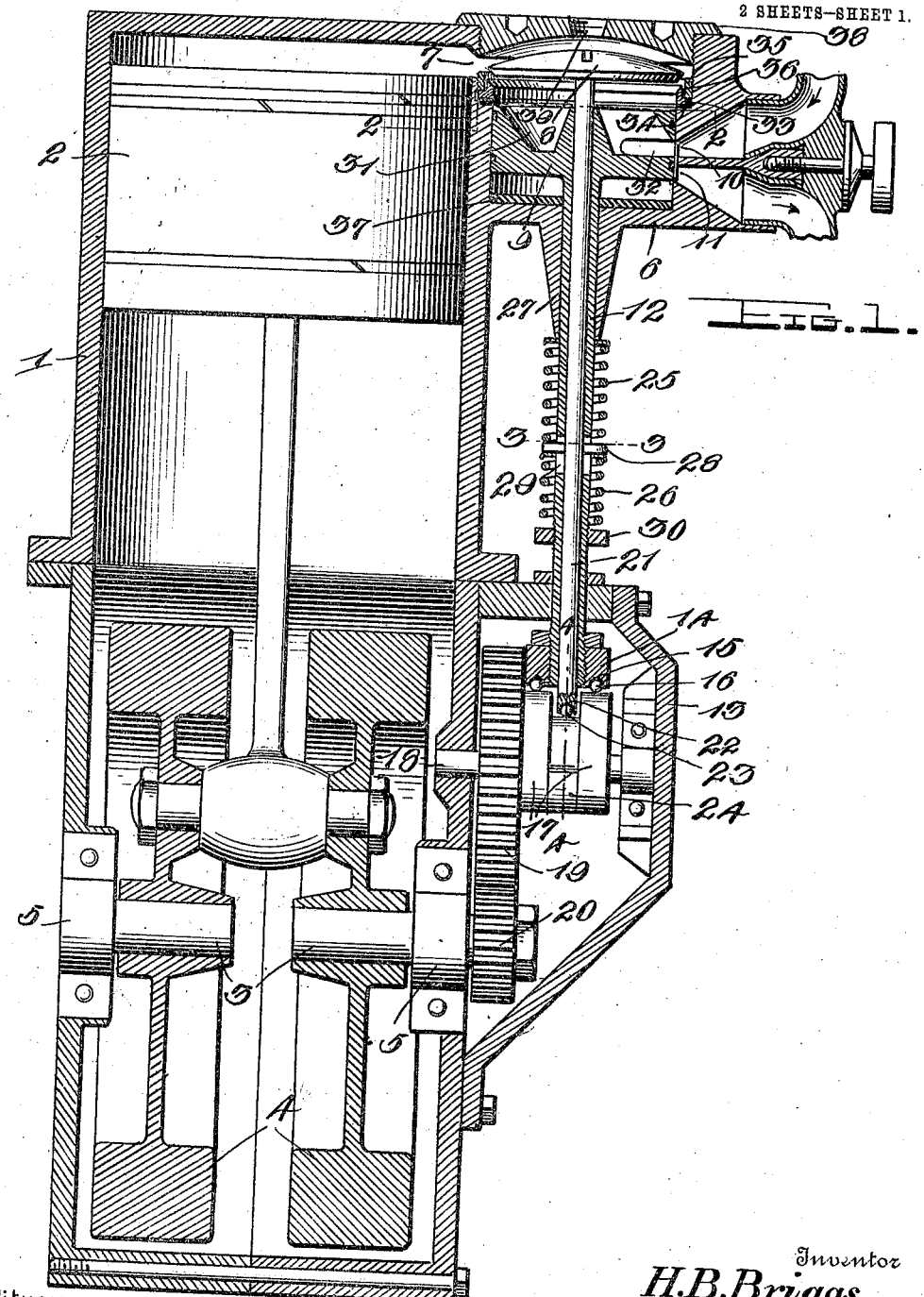

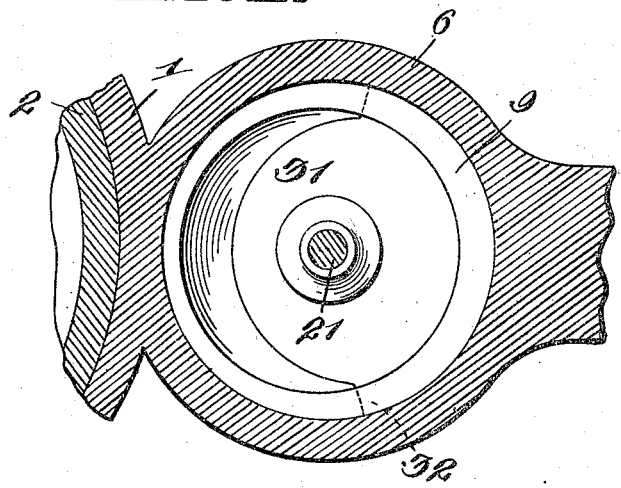
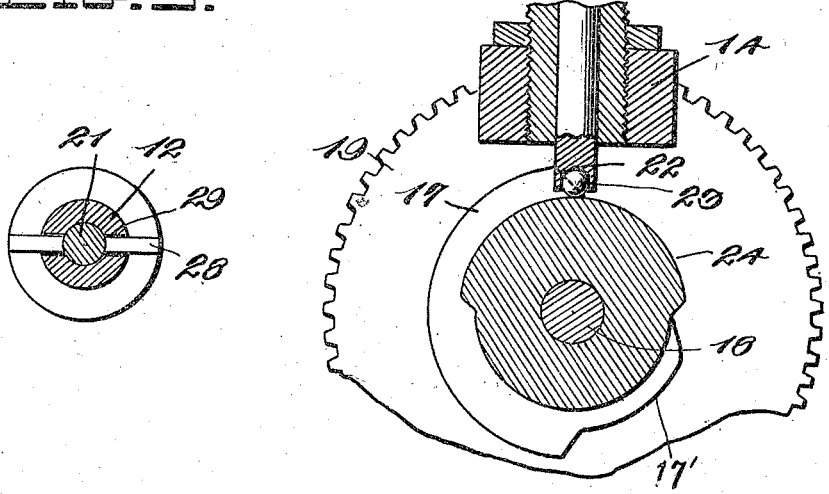

HERBERT BENJAMIN BRIGGS, OF TACOMA, WASHINGTON.

VALVE-OPERATING MECHANISM FOR ENGINES.

1,072,566. Specification of Letters Patent. Patented Sept. 9, 1913.

Application filed October 28, 1911. Serial No. 657,201.

*To all whom it may concern:*

Be it known that I, HERBERT BENJAMIN BRIGGS, a citizen of the United States, residing at Tacoma, in the county of Pierce and State of Washington, have invented certain new and useful Improvements in Valve-Operating Mechanism for Engines, of which the following is a specification, reference being had to the accompanying drawings.

This invention relates to new and useful improvements in valve operating mechanism for engines and has for its object the provision of improved means whereby a single opening into the cylinder constitutes both an inlet and an exhaust port for the engine, such opening being controlled by a mechanically operated compound valve.

Another object of the invention is to provide valve operating mechanism designed more especially for explosive engines used for automobile and marine purposes.

Another object of the invention is to provide a device of this character which will possess advantages in points of efficiency and durability, is inexpensive of manufacture and at the same time is simple in construction and operation.

With the above and other objects in view the invention consists in the novel features of construction and the combination and arrangement of parts hereinafter described, pointed out in the claims and shown in the accompanying drawings, in which—

Figure 1 is a vertical sectional view. Fig. 2 is a sectional view taken on the line 2—2 of Fig. 1. Fig. 3 is a sectional view taken on the line 3—3 of Fig. 1, and Fig. 4 is a sectional view taken on the line 4—4 of Fig. 1.

Referring more particularly to the drawings 1 indicates the cylinder of the engine and 2 a working piston movable therein. Rotatably mounted on the shafts 3 in the end of the cylinder are the disks 4, said shafts being journaled in suitable bearings 5 in the side of the cylinder. The lower end of the piston rod is arranged between and eccentrically connected to said disks. Arranged at the side of the cylinder 1 is a valve chamber 6 which is connected by the passage 7 with the cylinder 1.

Arranged in the chamber 6 are a pair of valves indicated by the numerals 8 and 9. The valve 8 is adapted to control the passage 7 and the valve 9 is adapted to control the inlet port 10 and the outlet port 11. The valve 9 is provided with a hollow stem 12 which is disposed through an opening in the chamber 6 and having its lower end disposed in a housing 13 secured to the lower end of the cylinder. Threaded onto the lower end of the stem 12 is a large nut 14 having recesses 15 formed in the lower face thereof and adapted to receive the bearings 16. The bearings 16 are adapted to engage with the cams 17 mounted on the shaft 18 which in turn is rotated by means of the gear 19 meshing with the pinion 20 which is mounted on the outer end of the shaft 3. A stem 21 is formed integrally with the valve 8 and is disposed down through the valve 9 and through the stem 12 and a recess 22 is formed in its lower end adapted to receive the bearing 23 which is adapted to engage with the cam 24 mounted on the shaft 18 and disposed between the cams 17.

Two coil springs 25 and 26 are mounted on the stem 12 one of said springs 25 having one end bearing on the sleeve 27 formed integral with the lower side of the valve chamber 6 and its other end bearing on the cotter pin 28 carried by the valve stem 21 and adapted to operate in a slot 29 formed in the stem 12. The spring 26 is disposed between the cotter pin 28 and a nut 30 threaded on the stem 12 and adapted to adjust the tension of the springs 25 and 26. The valve 9 is provided on its top side with a circular groove 31 and a port 32 is provided leading from said groove to the inlet and exhaust ports. The valve 8 is adapted to engage a valve seat 33 which is disposed in the recess 34 formed in the valve chamber and is held in position by means of a collar 35 threaded into said recess. A space 36 is formed between the valve seat and the wall of the chamber 6 to provide for clearance for the expansion and contraction of the cylinder. A woven copper asbestos washer 37 is placed in the bottom of the valve chamber for the valve 9 to strike on and relieve the noise and also cushion the valve. A cap 38 is threaded in the upper end of the valve chamber and provided with an opening 39 to receive an igniter (not shown).

The operation of my improved valve mechanism is as follows: As shown in Fig. 1, the piston has just finished the exhaust stroke and the stem 12 has been raised by contact with the raised portions of the cams 17 so that the inlet port 10 is open and the exhaust port 11 is closed. Upon the intake of the gases, the piston moves downwardly on its intake stroke, the lower end of the stem 21 moving from contact with the raised portion of the cam 24 closing the valve 8 which remains closed during one complete revolution of the disks or wheels 4, this revolution is during the compression and explosion strokes. At the end of the intake stroke, the piston moves upwardly on the compression stroke and at the end of the compression stroke the stem 12 drops on to the inlet portions 17' of the cams 17 where it remains during the explosion stroke. At the end of the explosion stroke, the stem 12 drops on to the small portions of the cams 17 while the stem 21 moves into contact with the raised portion of the cam 24 during the exhaust stroke of the piston, thus closing the intake port 10, opening the exhaust port 11 and the valve 8 to allow the exploded gases to pass out of the cylinder of the engine. At the end of the exhaust stroke, the lower end of the stem 12 moves into contact with the raised portion of the cams 17, opening the inlet port 10 and closing the exhaust port 11. Thus it will be seen from the above that as the piston reaches the top of the cylinder on the exhaust stroke, the inlet port is opened letting in a new charge of gas and the operation is repeated as above described.

It will be seen from the above that I have constructed a simple and efficient valve operating mechanism also an extremely cool valve and chamber by having the incoming gas pass through the same valve as the exhaust gas does. Another feature is the simplicity and compact construction of the valve mechanism, thus in using four or six cylinder engines each valve mechanism is independent of the other so if any valve should cause trouble the remaining cylinders would not be affected as they would with a rotary valve.

While I have shown and described the preferred form of my invention it will be obvious that various changes in the details of construction and in the proportions may be resorted to for successfully carrying my invention into practice without sacrificing any of the novel features or departing from the scope thereof.

Having thus described this invention what is claimed is:

1. In an engine, the combination of a cylinder, a working piston therein, a valve chamber formed integral with said cylinder and having a port communicating therewith, said valve chamber having an explosive inlet port and an exhaust port, a valve arranged in said chamber to control communication between the inlet and exhaust port and the chamber, a second valve arranged in said chamber and controlling communication between the chamber and the cylinder, a hollow stem formed on said first valve, a solid stem formed on the second valve and disposed in said hollow stem, coil springs mounted on said hollow stem, a cotter pin carried by the solid stem and disposed between said springs, said hollow stem having a slot in which said pin is adapted to operate, a nut threaded on said hollow stem and adapted to adjust the tension of said springs, rotating cams adapted to engage the lower end of said stems, and means in the reciprocation of said piston, for rotating said cams, and opening and closing said valves.

2. In an engine, the combination of a cylinder, a working piston therein, a valve chamber formed integral with said cylinder and having a port communicating therewith, said valve chamber having an explosive inlet port and an exhaust port, a valve arranged in said chamber to control communication between the inlet port and exhaust port and the chamber, a second valve arranged in said chamber and controlling communication between the chamber and the cylinder, a hollow stem formed on said first valve, a solid stem formed on the second valve and disposed in said hollow stem, a housing secured to the cylinder below the valve chamber, a nut threaded on the lower end of said hollow stem, and disposed within said housing, said nut having recesses formed in the lower face thereof, ball bearings mounted in said recesses, said solid stem having a recess formed in its lower end, a ball bearing mounted in said recess, rotating cams mounted within said housing and adapted to engage the ball bearings in the lower end of said stems, and means in the reciprocation of said piston for rotating said cams and opening and closing said valves.

In testimony whereof I hereunto affix my signature in the presence of two witnesses.

HERBERT BENJAMIN BRIGGS.

Witnesses:
ANNA A. BRIGGS,
JOHN H. ALTER.